United States Patent
Büttner et al.

(10) Patent No.: US 9,130,773 B2
(45) Date of Patent: Sep. 8, 2015

(54) ADDRESSING METHOD AND COMMUNICATION SYSTEM HAVING SUCH AN ADDRESSING METHOD

(75) Inventors: Holger Büttner, Berlin (DE); Jens Sachs, Petershagen (DE)

(73) Assignee: Beckhoff Automation GmbH, Verl (DE)

( * ) Notice: Subject to any disclaimer, the term of this patent is extended or adjusted under 35 U.S.C. 154(b) by 680 days.

(21) Appl. No.: 13/416,681

(22) Filed: Mar. 9, 2012

(65) Prior Publication Data

US 2012/0224580 A1 Sep. 6, 2012

Related U.S. Application Data

(63) Continuation of application No. PCT/EP2011/054458, filed on Mar. 23, 2011.

(30) Foreign Application Priority Data

Mar. 30, 2010 (DE) .......................... 10 2010 003448

(51) Int. Cl.
*H04J 1/16* (2006.01)
*H04L 12/42* (2006.01)
*H04L 12/403* (2006.01)
(Continued)

(52) U.S. Cl.
CPC .............. *H04L 12/42* (2013.01); *H04L 12/403* (2013.01); *H04L 29/12254* (2013.01); *H04L 29/12264* (2013.01); *H04L 61/2038* (2013.01); *H04L 61/2046* (2013.01); *H04L 41/0853* (2013.01)

(58) Field of Classification Search
CPC ....... H04L 12/437; H04L 12/42; H04L 12/56; H04L 2012/56; H04J 3/085; H04J 2203/006

USPC .......................... 370/389, 257, 258, 314, 222
See application file for complete search history.

(56) References Cited

U.S. PATENT DOCUMENTS 4,321,703 A * 3/1982 Schwaertzel et al. ......... 370/406
4,628,315 A 12/1986 Douglas
(Continued)

FOREIGN PATENT DOCUMENTS

| CN | 101374094 A | 2/2009 |
|---|---|---|
| DE | 37 36 081 A1 | 5/1989 |

(Continued)

OTHER PUBLICATIONS

Janssen et al EtherCAT—Der Ethernet-Feldbus. In Elektronik, 2003, No. 23, pp. 64-72; No. 25, pp. 62-67.-ISSSN 0013-5658.
(Continued)

*Primary Examiner* — Brenda H Pham
(74) *Attorney, Agent, or Firm* — Nathaniel P. Longley; Dorsey & Whitney LLP

(57) ABSTRACT

A method retrieves subscriber identifications in a communication network having multiple sub-scribers which are connected to a ring-shaped transmission path. A first telegram is outputted onto the ring-shaped transmission path which comprises a sequence of telegram fields, wherein each subscriber is allocated a telegram field for entering its subscriber identification and each subscriber checks during the passing-through of the first telegram if the subscriber identification field allocated to the subscriber is vacant, and upon detecting a vacant subscriber identification field enters its subscriber identification.

21 Claims, 4 Drawing Sheets

(51) Int. Cl.
*H04L 29/12* (2006.01)
*H04L 12/24* (2006.01)

(56) References Cited

U.S. PATENT DOCUMENTS

| | | |
|---|---|---|
| 4,881,074 A | 11/1989 | Reichbauer et al. |
| 6,088,726 A | 7/2000 | Watanabe |
| 2009/0055564 A1* | 2/2009 | Klotz et al. .................. 710/118 |

FOREIGN PATENT DOCUMENTS

| | | |
|---|---|---|
| DE | 198 56 616 A1 | 7/1999 |
| DE | 10 2008 037 093 A1 | 2/2010 |
| EP | 0 290 934 | 11/1988 |
| EP | 0 436 932 | 7/1991 |
| WO | WO 2002/098183 | 12/2002 |

OTHER PUBLICATIONS

International Search Report and Written Opinion mailed May 16, 2011 in connection with International Patent Application No. PCT/EP2011/054458.
German Office Action dated Dec. 20, 2010 in connection with German Patent Application No. 10 2010 003 448.7-31.
Chinese office action received Mar. 24, 2014 for application No. 2011800044343. (4 pages).
English translation of Chinese office action received Mar. 24, 2014 for application No. 2011800044343. (4 pages).

* cited by examiner

ADDRESSING METHOD AND COMMUNICATION SYSTEM HAVING SUCH AN ADDRESSING METHOD

CROSS-REFERENCE TO RELATED APPLIATIONS

This application is a continuation of International Patent Application No. PCT/EP2011/054458, filed on Mar. 23, 2011, which claims priority to German Patent Application No. 10 2010 003 448.7-31, filed Mar. 30, 2010, the entire contents of all of which are hereby incorporated herein by reference in their entirety.

BACKGROUND

The present invention relates to a method for retrieving subscriber identifications in a communication network having multiple subscribers which are connected to a ring-shaped transmission path. Furthermore, the present invention relates to a ring-bus communication network comprising a configuration subscriber and further subscribers connected to the ring bus.

Present-day concepts of industrial automation, i. e. controlling and monitoring of technical processes by means of software, are based on the idea of a central control system having a distributed sensor/actuator level. Therein, the subscribers communicate with each other and with superordinate systems via local communication networks known as Local Area Networks (LANs). LANs applied in industrial automation are usually configured as what is known as master-slave communication networks in which master subscribers form the control level and slave subscribers form the sensor/actuator level.

A preferred topology in the construction of LANs is the ring topology in which the subscribers are connected to each other via two point connections so that a closed ring is formed. Such ring-bus systems automatically prevent the collision of circulating data packets, are simple to be scaled and easy to program. Furthermore, network communication in ring-bus systems is deterministic and all subscribers have the same access options.

The safe and reliable data transmission is an essential requirement to LANs when used in industrial automation. When LANs are used for controlling machines, it has to be safe-guarded that no danger is posed to humans and the environment in case one machine component fails. Therefore, LANS in industrial automation, in the following also referred to as automation networks, usually work with what is known as the fail-safe principle according to which the automation network is switched to a safe status if essential components fail. Therein, it is the task of automation computers in the automation network, i. e. master subscribers, to process the process signals for carrying out control functions in a current and unadulterated manner when carrying out safety-relevant control functions according to the failsafe principle and to always report a safe process status to the sensors/actuators of the automation network, i. e. the slave subscribers.

For a safe and reliable communication, particularly also in automation networks, it is an essential requirement that the correct slave subscriber is always addressed. Therefore, the slave subscribers are assigned with an identification, usually an address, by means of which they may be identified unambiguously. The subscriber addresses are then at the same time stored in the control programs to be carried out which run on the master subscribers in the automation network. However, setting the subscriber addresses is usually complicated and error-prone. Setting the addresses in the individual subscribers is conventionally carried out by means of address-selecting switches. Then, the set subscriber addresses have to be transmitted to the master subscribers which carry out the control programs. In this context, there is the danger of falsely entering or altering an address, respectively, which presents a high risk, especially in the case of safety-relevant subscribers. Therefore, for ensuring that addresses are entered in a reliable manner, a high organizational effort is required.

In order to facilitate the setting of subscriber addresses, in particular in automation networks, methods for setting addresses by means of software have recently been applied. For example, in DE 10 2008 037 093 A1 a method for automatically addressing subscribers in a communication network is suggested in which the subscribers are by means of a common bus connected to a configuration subscriber which carries out the address allocation by transmitting a setting signal to a first downstream subscriber which thereupon allocates a first address to be allocated to itself. This subscriber then transmits the allocated addresses in the form of a modulated output signal to the next subscriber which then allocates the second address to be allocated to itself. This method is then carried out until the last subscriber on the bus has allocated an address to itself. The danger of this approach, however, is that one subscriber allocates a wrong address to itself due to a program error, this error then propagating into the entire automation network.

DE 37 36 081 A1 discloses a further automatic method for setting addresses for subscribers in a communication network in which the addresses are allocated by a configuration subscriber. The configuration subscriber then again retrieves the addresses from the subscriber in order to verify if the correct address has been set. In this approach, however, there is also the problem that the wrong address is respectively set or reported due to transmission errors.

SUMMARY

Various aspects of the present invention provide an improved method and an improved communication network.

One embodiment of the present invention provides method for retrieving subscriber identifications in a communication network having multiple subscribers which are connected to a ring-shaped transmission path. A first telegram is outputted onto the ring-shaped transmission path which comprises a sequence of telegram fields, wherein each subscriber is allocated a telegram field for entering its subscriber identification and each subscriber checks during the passing-through of the first telegram if the subscriber identification field allocated to the subscriber is vacant, and upon detecting a vacant subscriber identification field enters its subscriber identification.

Another embodiment of the present invention provides a communication network comprising multiple subscribers which are connected to a ring-shaped transmission path and a configuration subscriber. The configuration subscriber is configured to output a first telegram onto the ring-shaped transmission path during the initialization of the communication network which comprises a sequence of telegram fields, wherein each subscriber is allocated a telegram field for entering its subscriber identification, wherein each subscriber is configured to check during the passing-through of the first telegram whether the subscriber identification field allocated to the subscriber is vacant and to enter its subscriber identification upon determining a vacant subscriber identification field.

Another embodiment of the present invention provides method for retrieving subscriber identifications in a communication network having multiple subscribers which are connected to a ring-shaped transmission path, wherein each subscriber receives information on its position on the ring-shaped transmission path with respect to the further subscribers and the circulating direction of a telegram.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Local communication networks known as Local Area Networks (LANs) allow for exchanging data and/or resources between subscribers in a simple manner and for sharing them. Such LANs are increasingly also used in industrial automation, i. e. in controlling and monitoring technical processes by means of software. In this context, the Ethernet concept is the most wide-spread communication standard in LANs. By means of the Ethernet technology current data packages, in the following also referred to as telegrams, having a length of 1,500 bytes may be transmitted at a transmission rate of up to 10 GBit/s. Ring-networking is one possible network topology for LANs. In ring topology, the subscribers on the communication network are coupled via two-point connections so that a closed ring is created. The telegrams are forwarded from subscriber to subscriber until the subscriber addressed in the data package has been reached. The ring bus as a network topology is preferably also used in industrial automation.

Figure 1:
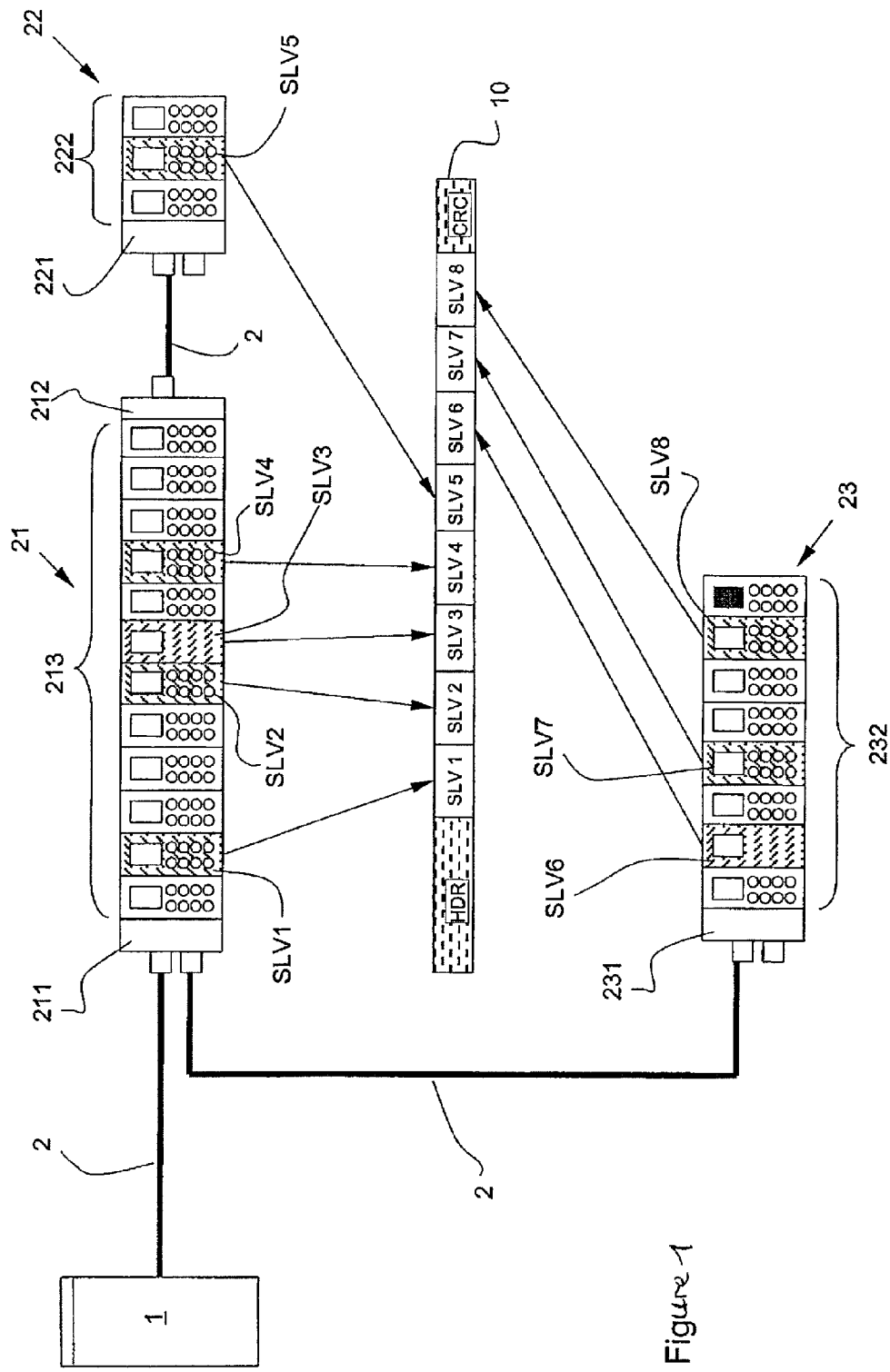
FIG. 1 schematically depicts an embodiment of an inventive communication network when processing a first telegram.

FIG. 1 schematically depicts a ring-bus communication network for use in industrial automation. Such automation networks, often also referred to as field-bus systems, serve for connecting sensors and actuators at a control system in a decentralized manner. In this context, field-bus systems are frequently organized as master-slave communication networks in which master subscribers form the control level and slave subscribers form the sensor/actuator level. At this, the master subscribers have an active access authorization to the communication network. The master subscribers, in contrast, may only become active with respect to the communication network if they have been requested to do so by the master subscriber.

The field-bus system depicted in FIG. 1 is configured as a bus terminal system and comprises a control computer 1 which is connected to three bus stations 21, 22, 23 via a data-transmission path 2, e. g. a twisted-pair cable, a fiber optic cable or a radio contact. The bus stations 21, 22, 23 are in turn interconnected via the data-transmission path 2. Each bus station 21, 22, 23 is composed of bus coupler and bus terminals which are preferably arranged on a support rail. The bus couplers form the communication interface to the superordinate control system. The bus terminals are connected to the sensors/actuators (not depicted here). In the embodiment shown in FIG. 1, the bus station 21 comprises two bus couplers 211, 212 between which twelve bus terminals 213 are arranged. The second bus station 22 comprises a bus coupler 221 and three bus terminals 222. The third bus station 23 is composed of one bus coupler 231 and eight bus terminals 232.

Thereby, the control computer 1 as well as the three bus stations 21, 22, 23 or, respectively, the bus couplers and bus terminals in the three bus stations are interconnected in series as a ring bus via the data-transmission path 2 and/or via the internal connection in the bus stations. Therefore, upon being outputted by the control computer 1, a telegram runs via the transmission path 2 to the first bus station 21, wherein the telegram is received by the bus coupler 221 in the first bus station 21 and is then forwarded via the internal connection by the one bus terminal 213 to the next. The second bus coupler 212 at the other end of the first bus station then, when the telegram has passed through the first bus station 21, transmits it to the second bus station 22 via the transmission path 2, wherein the bus coupler 221 of the second bus station 22 internally forwards the telegram to the downstream bus terminals 222. When the telegram has passed through all bus terminals 222 of the second bus station 22, the bus coupler 221 of the second bus station 22 forwards the telegram to the third bus station 23 via the two bus couplers 212, 211 of the first bus station 21, the bus couplers 231 of the third bus station 23 internally passing on the telegram to the downstream bus terminals 232. When the telegram has passed through all bus terminals 232 of the third bus station 23, it is transmitted back to the control computer 1 via the bus coupler 231 of the third bus station 23, via the first bus coupler 211 of the first bus station 21. Of course, as an alternative to the bus terminal system shown in FIG. 1, it is possible to couple the individual subscribers in a communication network with each other in any arbitrary manner, wherein, however, the subscribers are always connected in series and form a closed transmission ring.

As a basic principle, it must be safeguarded in automation networks for controlling machines that errors which occur in the automation network do not pose any danger to humans and the environment. When carrying out safety-relevant control functions, it is an essential requirement to the automation network that the process data are processed in an up-to-date and unadulterated manner by sensors when carrying out safety-relevant control functions and that a safe process status is always indicated to the actuators.

Generally, not all subscribers in automation networks are safety-relevant so that as a rule one or multiple special safety areas are formed in automation networks. In the automation network shown in FIG. 1 in the form of a bus-terminal system, two safety areas are formed, wherein a first safety area is formed by a safety master SLV3 and safety-relevant slave subscribers SLV1, SLV2, SLV4 in the first bus station 21 and the safety-relevant slave subscriber SLV5 in the second bus station 22. Thereby, the subscribers of the first safety area are arranged such that in the bus-terminal system starting from the control computer 1 in circulating direction of the telegram the safety-relevant slave subscribers SLV1, SLV2 are arranged before the safety master SLV3 and the safety-relevant slave subscribers SLV4, SLV5 are arranged behind the safety master SLV3. In the automation network shown in FIG. 1, a second safety area is provided that is formed by the safety master SLV6 arranged in the third bus station 23 and the two safety-relevant slave subscribers SLV7, SLV8, wherein the safety-relevant slave subscribers SLV7, SLV8 are in the bus-terminal system arranged downstream to the safety master SLV6 with respect to the control computer 1 and the circulating direction of the telegram.

It is a central requirement to automation systems that the telegrams between the subscribers on the communication network are transmitted in an error-free and unadulterated manner.

Addressing the subscribers is thereby carried out via subscriber identifications, in the following also referred to as addresses, which must be unambiguous in the communication network. This in particular applies to the safety-relevant subscribers in safety control systems. The inventive approach in an automatic addressing, and in particular in retrieving subscriber identifications is in the following described in particular for safety control systems and their safety-relevant subscribers. However, automatic addressing and/or retrieving subscriber identifications as described in the following may be used in arbitrary ring-bus communication networks and is not limited to safety-relevant subscribers.

In the safety control systems, i. e. in the safety masters SLV3, SLV6 depicted in the embodiment of FIG. 1, the safety addresses of the safety-relevant slave subscribers to be communicated with are stored. The safety program which runs in the respective safety control systems, i. e. in the embodiment shown in FIG. 1 in the safety masters SLV3, SLV6, contains the safety address of the associated safety control system, i. e. the safety address of the safety masters SLV3, SLV6.

Setting safety addresses in an automation network is usually complicated and error-prone. This is the case for the setting of safety addresses in the individual safety-relevant subscribers as well as for the exchange of safety addresses within the framework of initializing the automation network. In order to simplify the setting of the subscriber identification in a communication network, in particular the safety addresses of the safety-relevant subscribers in an automation network, the serial identification of the corresponding subscriber is used as subscriber identification. The serial identification of a subscriber, usually consisting of a manufacturer identification, a device-type identification and a serial number, is globally unambiguous and therefore suitable for using it in particular also as safety address. The safety addresses of the safety-relevant subscribers are transmitted to the safety masters by a telegram sequence consisting of three telegrams. The address transmission as described in the following is also suitable for the transmission of arbitrary subscriber identifications. Furthermore, it is possible to transmit different or additional data instead of the subscriber identification.

Address transmission is preferably carried out within the framework of initializing the automation system and is triggered by the control computer 1 which serves as configuration subscriber in the embodiment shown in FIG. 1. Alternatively, it is possible that any arbitrary other subscriber on the ring-bus system initiates the address transmission. It is also possible that the configuration subscriber itself also participates in the address transmission at the same time. In the bus-terminal system shown in FIG. 1, the control computer 1 initiates the successive circulation of three initialization telegrams by means of which the safety addresses of the safety-relevant slave subscribers are transmitted to the associated safety masters in a reliable and unadulterated manner. The three initialization telegrams each comprise a header section, a sequence of telegram fields, the number of telegram fields corresponding to the number of safety-relevant subscribers, i. e. safety-relevant slave subscribers as well as safety masters which is to carry out the address exchange, and an end section. The header section preferably contains a telegram identification HDR in order to be able to distinguish the three initialization telegrams from each other. The end section comprises a test field CRC into which a test character may be entered which is calculated from the remaining data in the telegram.

FIG. 1 depicts the first initialization program 10 which is outputted onto the ring-shaped transmission path 2 by the control computer 1 and successively passes through the bus stations 21, 22, 23 and the bus couplers or, respectively, bus terminals included therein. In the depicted embodiment, only the safety-relevant slave subscribers and/or safety masters of the first and second safety areas participate in the address transmission. In this context, it is the objective to transmit the addresses of the safety-relevant slaves SLV1, SLV2, SLV4 and SLV5 belonging to the first safety circuit to the safety master SLV3 of said first safety circuit and to transmit the addresses of the safety-relevant slave subscribers SLV7, SLV8 to the safety master SLV6 of the second safety circuit.

The first initialization telegram 10 in the data block contains a telegram field for each subscriber participating in address transmission, i. e. for all safety-relevant slave subscribers and safety masters of the embodiment shown in FIG. 1. Thereby, the length of the telegram field allocated to the subscriber may be adapted to the size of the respective subscriber address. The telegram field may, however, also comprise a predetermined length, wherein the number of locations of the telegram field corresponds to a maximum address length. When the first initialization telegram 10 is outputted onto the ring-shaped transmission path by the control computer 1, the subscriber fields are empty. In this context, empty may also mean that the locations of the subscriber fields are occupied by a predetermined value, e. g. a digital 0. Further, the first initialization telegram 10 comprises a telegram identification HDR in its header section. This telegram identification is predetermined by the control computer 1 by setting a start value, e. g. a digital 1, e. g. in an allocated telegram identification field. The control computer 1 enters a test value for the telegram in a test field CRC in the end section of the first initialization program 10, the test value being calculated e. g. by means of the cyclic redundancy test procedure also known as CRC procedure. However, it is also possible to use other verification procedures for determining a test value.

The first initialization telegram 10 outputted by the control computer 1 successively passes through all subscribers arranged on the ring-shaped transmission path, i. e. the bus couplers and bus terminals of the bus stations 21, 22, 23, wherein the subscribers intended for address transmission, i. e. the safety masters SLV3, SLV6 and the safety-relevant slave subscribers SLV1, SLV2, SLV4, SLV5, SLV7, SLV8 enter their addresses, which preferably are the serial identifications of the subscriber, in the subscriber fields allocated to the respective subscribers. During their passing-through, the subscribers check whether the subscriber identification field allocated to the subscriber is vacant. If a vacant subscriber identification field is determined, the address is entered. If it is determined that a subscriber field is not vacant, an error identification is entered in contrast. Said error identification may be a predetermined error value. However, it is also possible that as a form of error identification, the subscriber identification field is simply left empty by the subscriber and/or that the original filling value determined by the control computer 1 is maintained or re-entered in the subscriber field. Upon entering the address and/or the error identification, the subscriber recalculates the test value by means of the same verification procedure which the control computer 1 also comprises and enters the calculated test value into the test field in the end section of the first initialization telegram 10.

Each subscriber participating in address transmission possesses information on the respective position of the subscriber on the ring-shaped transmission path in relation to the further subscribers participating in address transmission as well as the circulating direction of the telegram. In the embodiment shown in FIG. 1, the safety-relevant slave subscriber SLV1 knows that it is on the first position, the safety-relevant slave subscriber SLV2 knows that it is on the second position, the safety master SLV3 knows that it is on the third position, the safety-relevant slave subscriber SLV4 knows that it is on the fourth position, the safety-relevant slave subscriber SLV5 knows that it is on the fifth position, the safety master SLV6 knows that it is on the sixth position, the safety-relevant slave subscriber SLV7 knows that it is on the seventh position and the safety-relevant slave subscriber SLV8 knows that it is on the eighth position. This position information may be transmitted by the control computer 1 to the subscribers before the initialization process by means of a telegram preceding the first initialization telegram. However, the position information may also be contained in the header section of the first initialization telegram 10 within a telegram field which is particularly provided therefore. Furthermore, it is possible that the position information is directly stored to the individual subscribers.

In addition to the test process on whether the subscriber identification field allocated to the subscriber is vacant, each subscriber further checks during the passing-through of the first initialization telegram 10 whether subscriber identification fields arranged before the subscriber identification field allocated to the subscriber respectively contain an address and whether subscriber identification fields arranged behind the subscriber identification field allocated to the subscriber are vacant. When detecting an error, the subscriber then enters the error identification into the subscriber identification field allocated to the subscriber of the first initialization telegram 10.

In this context, the test processes may be carried out by the subscribers in such a way that the subscriber completely reads in the circulating telegram into its local memory and then evaluates the telegram and subsequently carries out the entry in the telegram, i. e. the entry of the address and/or the error identification and/or the test value. The safety masters SLV3, SLV6 in FIG. 1 are furthermore configured such that they completely read out the subscriber identification fields of the three initialization telegrams and compare them with the list of addresses of the allocated safety-relevant slave subscribers with which it is to communicate, this list being stored in the safety masters. Thereby, the safety masters also read out their own telegram identification fields allocated to them and transmit their content to the safety program stored in the safety master, the address of the allocated safety master being in turn stored in the safety program.

Figure 2:
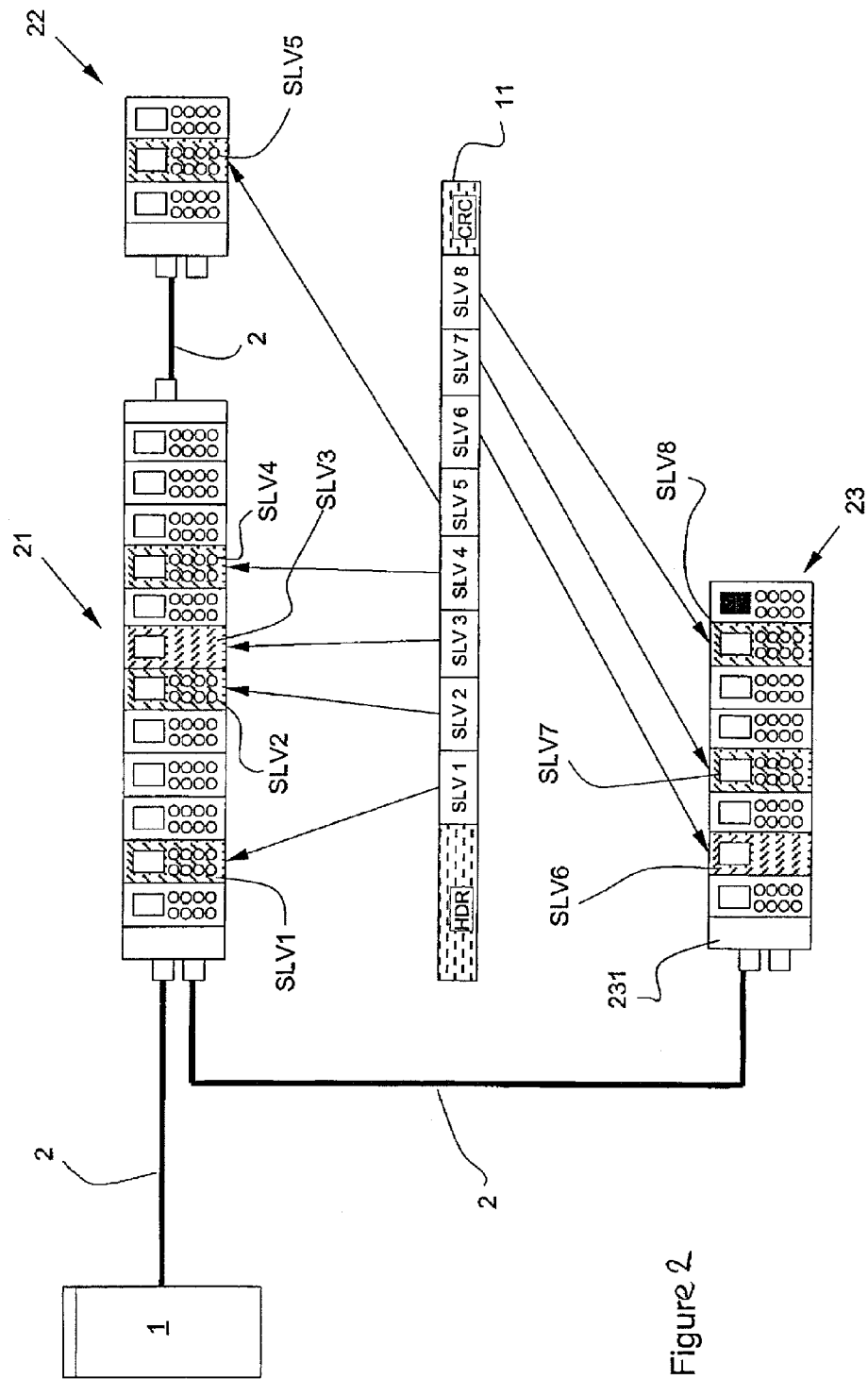
FIG. 2 shows the communication network depicted in FIG. 1 when processing a second telegram.

The safety master SLV3 of the first safety area receives the addresses of the safety-relevant slave subscribers SLV1, SLV2 allocated to it which are arranged before it on the transmission path by the first initialization telegram 10. However, the safety master SLV3 does not receive the addresses of the safety-relevant slave subscribers SLV4, SLV5 which are also allocated to it by the first initialization telegram 10. This also applies to the safety master SLV6 of the second safety area which does not receive the addresses of the downstream safety-relevant slave subscribers SLV7, SLV8 by the first initialization telegram 10. Therefore, in order to carry out a complete address transmission, the first initialization telegram upon complete circulation on the transmission path 2 is outputted again on the transmission path 2 as second initialization telegram 11 by the control computer 1 as shown in FIG. 2. The second initialization telegram 11 is configured analogously to the first initialization telegram 10 and contains the subscriber identification fields of the first initialization telegram 10 after circulating the ring-shaped transmission path 2. The control computer 1 enters a telegram identification HDR for the second initialization telegram 11 in the header section. The control computer may determine this telegram identification e. g. by incrementing the telegram identification of the first initialization telegram 10. It is also possible that the control computer 1 uses the test value of the first initialization telegram 10 if the case may be added to the telegram identification of the first initialization telegram 10 as telegram identification for the second initialization telegram 11. Furthermore, the control computer 1 carries out a calculation of the test value and enters the result into the test field CRC in the end section of the second initialization telegram 11.

During circulation of the second initialization telegram 11 on the ring-shaped transmission path 2, each subscriber during passing-through checks if the subscriber identification field allocated to the subscriber contains its address. Upon detecting an error, the subscriber enters an error identification into the subscriber identification field allocated to the subscriber of the second initialization telegram 11 in a procedure analog to that of the first initialization telegram 10. Upon implementing an entry, the subscriber then also recalculates the test value for the second initialization telegram 1 and enters the result in the test field into the end section of the second initialization telegram 11.

The safety masters SLV3, SLV6 process the second initialization telegram 11 analogously to the first initialization telegram 10, i. e. they read out the subscriber identification fields and compare the read-out addresses with the predefined list of allocated communication subscribers. Thus, by means of the second initialization telegram 11, the two safety masters SLV3, SLV6 receive the addresses of the safety-relevant slave subscribers respectively downstream on the transmission path which have not yet been transmitted with the first initialization telegram 10; i. e. the first safety master SLV3 receives the addresses of the safety-relevant slave subscribers SLV4, SLV5 and the second safety master SLV6 receives the addresses of the safety-relevant slave subscribers SLV7, SLV8. However, the two safety masters SLV3, SLV6 do not receive any information by means of the circulating second initialization telegram 11 whether, when checking the subscriber identification field allocated to them, the downstream safety-relevant slave subscribers have detected that a wrong entry exists which the subscribers indicated the by means of entering an error identification into the second initialization telegram 11.

Figure 3:
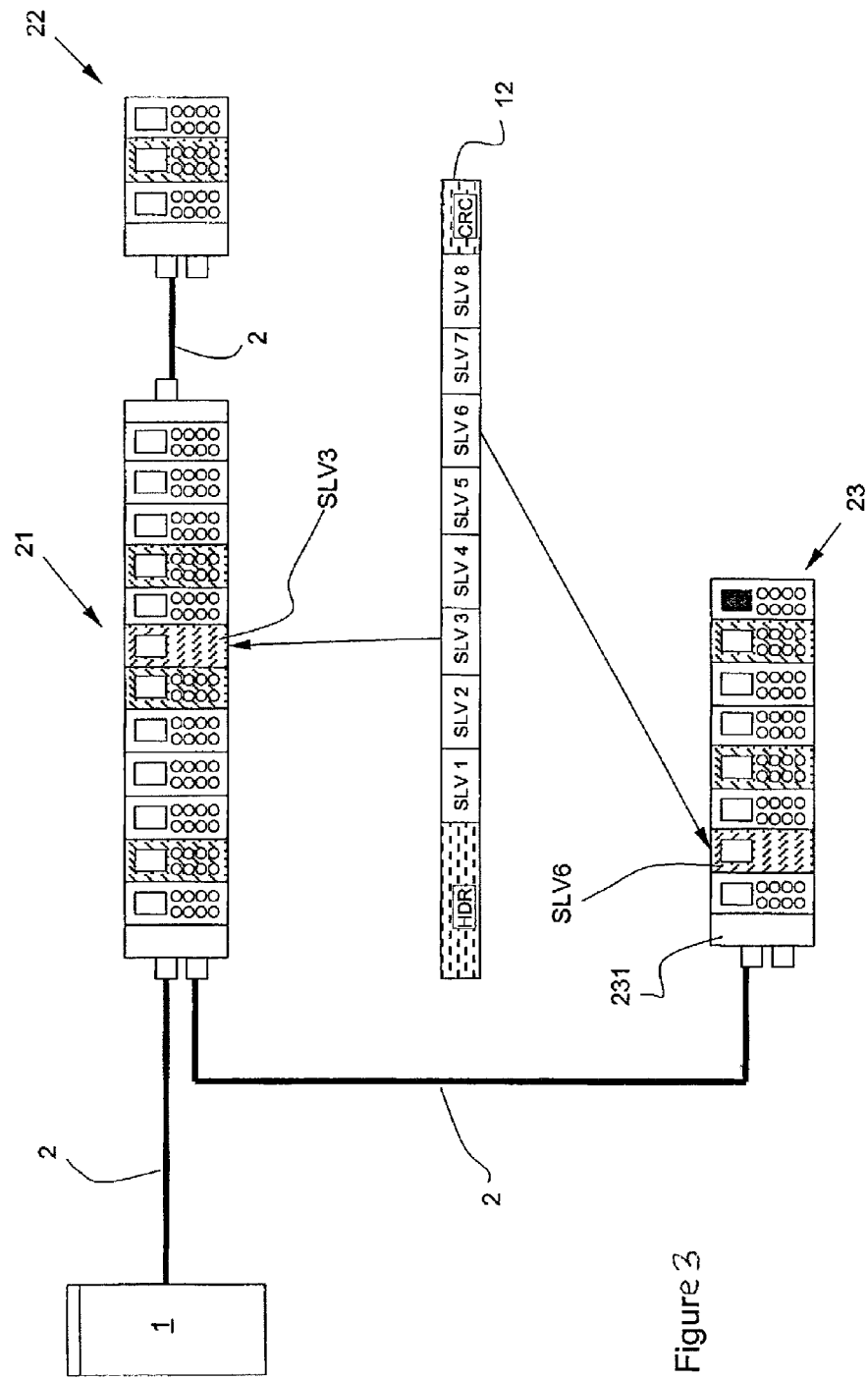
FIG. 3 shows the communication network depicted in FIG. 1 when processing a third telegram.

In order to transmit this information to the safety masters SLV3, SLV6 as well, the control computer 1 outputs a third initialization telegram 12 on the ring-shaped transmission path 2, as depicted in FIG. 3, the third initialization telegram 12 containing the telegram fields of the second initialization telegram 11 after its circulation on the ring-shaped transmission path 2. At the same time, the control computer 1 enters the subscriber identification HDR allocated to the third initialization telegram in the header section of the third initialization telegram 12, wherein it determines the telegram identification analogously to the telegram identification in the second initialization telegram. Further, a new calculation of the test value in the test field CRC in the end section of the third initialization telegram 12 is preferably carried out by the control computer 1. The third initialization telegram 12 is then during its passing-through read in and evaluated by the safety masters SLV3, SLV6 in order to detect if the downstream safety-relevant slave subscribers SLV4, SLV5 and/or SLV7, SLV8 have entered an error.

By means of the described method of address transmission, an address transmission may be carried out in a simple and reliable manner, in particular also within the framework of a safety control system in an automation network. The first two initialization telegrams which are outputted by the configuration subscriber onto the ring-shaped transmission path reliably provide for transmitting the subscriber identification to the subscribers participating in the exchange of subscriber identifications, in the embodiment shown in FIGS. 1 to 3 in particular to the safety masters SLV3, SLV6. It is then also safeguarded by means of the additional third telegram that not only the subscriber identifications, but also the error identifications entered in the initialization telegrams by the subscribers are transmitted to the subscribers on the ring-shaped transmission path, in particular to the master subscribers.

Upon evaluation of the initialization telegrams, the master subscribers may decide whether they carry out the allocated control program. The master subscribers may take this decision already on the basis of the first two initialization telegrams, e. g. in the case that not all subscriber identifications which are contained in the list of subscriber identifications respectively stored in the master subscriber have been transmitted to them. However, the master subscribers may also make this decision dependent on whether error identifications have been transmitted then when three initialization telegrams circulate. In a safety control system the master subscribers, in the embodiment shown in FIGS. 1 to 3 the safety masters SLV3, SLV6, may then bring the allocated safety-relevant slave subscribers in a safe status according to the fail-safe principle.

Alternatively to the embodiment depicted in FIGS. 1 to 3 in which three initialization telegrams are applied in order to reliably transmit error identifications additionally to subscriber identifications, it is also possible to apply four initialization telegrams for said transmission of subscriber identifications and/or error identifications. In this embodiment, the subscribers provided for address transmission, in the embodiment of FIGS. 1 to 3 the safety masters SLV3, SLV6 and the safety-relevant slave subscribers SLV1, SLV2, SLV4, SLV5, SLV7, SLV8, do not already enter their error identifications into the circulating initialization telegram, but only in the subsequent initialization telegram.

With respect to the first initialization telegram circulating on the transmission path, this means that each subscriber checks during the passing-through of the initialization telegram if the subscriber identification field allocated to the subscriber is vacant in order to enter its subscriber identification when detecting a vacant subscriber identification field. When detecting an occupied subscriber identification field, the subscriber memorizes this and then enters an error identification only into the second circulating initialization telegram. At the same time, each subscriber checks during the passing-through of the second initialization telegram if the subscriber identification field allocated to the subscriber contains its subscriber identification. When an error is detected, the subscriber in turn stores this and enters an error identification into the third circulating initialization telegram. The third initialization telegram is then again outputted onto the transmission path as fourth initialization telegram by the configuration subscriber, in the embodiment shown in FIGS. 1 to 3 by the control computer 1, in order to ensure that all subscribers are informed on the error identifications entered in the third initialization telegram. In the embodiment shown in FIGS. 1 to 3, the fourth initialization telegram transmits in particular a possible entry of error identifications of the slave subscribers SLV4, SLV5 and/or SLV 7, SLV8 subordinate to the safety masters SLV3, SLV6 to the safety masters SLV3, SLV6.

In an embodiment having four initialization telegrams, the first three initialization telegrams correspond to the initialization telegrams as they have been explained in conjunction with the embodiments shown in FIGS. 1 to 3. In contrast to these initialization telegrams, however, a possible error identification is always entered by the subscribers participating in the address exchange only in the subsequent telegram. Therefore, in contrast to the embodiment shown in FIGS. 1 to 3, the possibility of a write access is provided in the case of the third initialization telegram, in particular by means of the slave subscribers SLV1, SLV2, SLV4, SLV5, SLV6, SLV7 in order to carry out error entries. The fourth initialization telegram then contains the third initialization telegram after its circulation on the ring-shaped transmission path 2, wherein the control computer 1 enters a subscriber identification HDR allocated to the fourth initialization telegram in the header section of the fourth initialization telegram, analogously to the procedure with the other initialization telegrams. Also with the fourth initialization telegram, a recalculation of the test value in the test field CRC in the end section of the fourth initialization telegram is preferably carried out by the control computer 1. During its passing-through, the fourth initialization telegram is then read in and evaluated by the safety masters SLV3, SLV6 in order to also register error identifications entered by the slave subscribers SLV4, SLV5 and/or SLV7, SLV8 subordinate to them and to then react to them in a manner as described above.

Figure 4:
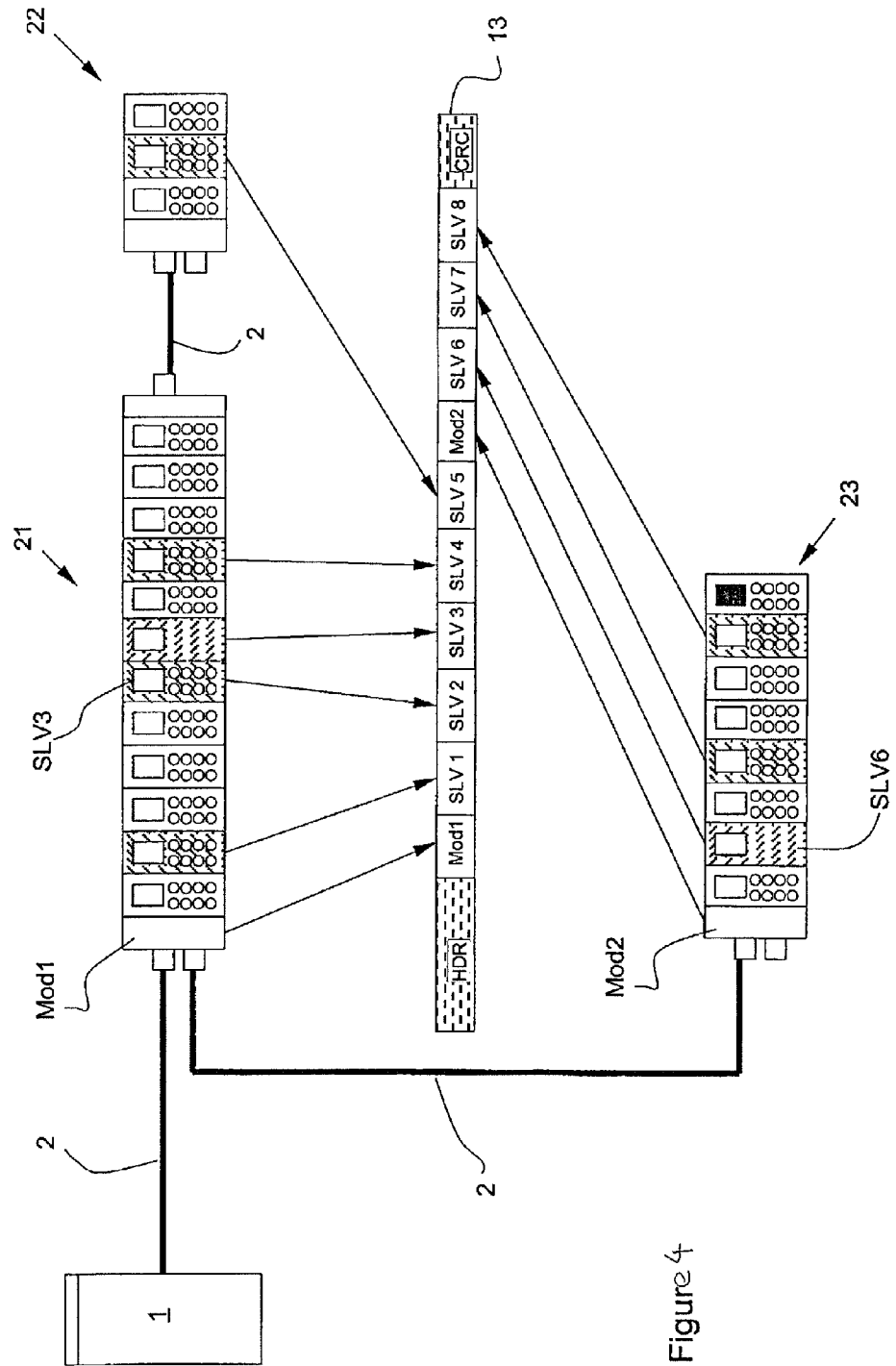
FIG. 4 depicts the communication network shown in FIG. 1 when processing a modified first telegram.

However, the described method is not only suitable for transmitting addresses, but also for safely transmitting any arbitrary setting values on the ring-shaped transmission path. FIG. 4 depicts an embodiment in which setting values are transmitted to the safety masters SLV3, SLV6 in addition to the addresses. For this purpose, setting-value fields are additionally provided in the initialization telegrams—FIG. 4 shows a first modified initialization telegram 13—into which allocated setting devices may respectively enter setting values, analogously to the method in address transmission. Thereby, the setting devices are informed on their position on the transmission path 2 with respect to the subscribers participating in the transmission process and the direction of telegram circulation.

In the embodiment depicted in FIG. 4, the bus coupler MOD 1 of the first bus station 21 and the bus coupler MOD 2 of the third bus station 23 are provided as setting devices which are to additionally enter setting values into the initialization telegrams. The setting value entered by the bus coupler MOD 1 is transmitted to the safety master SLV3 of the first safety area; the setting value entered by the bus coupler MOD2 is transmitted to the safety master SLV6 of the second safety area. The setting values may e. g. serve for specifying the safety program to be selected by the respective safety master. The safety masters may e. g. comprise a standard safety program having different predefined configurations, wherein the respective configuration is then activated by means of the transmitted setting value.

For retrieving subscriber identifications in a ring-bus communication network, a first telegram is outputted to the ring-shaped transmission path, the first telegram comprising a sequence of telegram fields, wherein the subscribers on the ring-shaped transmission path are respectively assigned one telegram field for entering their subscriber identifications. When the first telegram passes through, the subscribers on the transmission path verify whether the subscriber-identification field allocated to the subscriber is vacant. If a vacant subscriber-identification field is detected, the subscriber enters its subscriber identification into the vacant subscriber-identification field. Subsequently, a second telegram is outputted on the ring-shaped transmission path which contains the subscriber-identification fields of the first telegram after circulation on the ring-shaped transmission path. The first and the second telegram are outputted to the ring-shaped transmission path by a configuration subscriber when initializing the communication network.

By means of the method, it is guaranteed that in a ring-bus communication network, subscriber identifications may be safely and reliably transmitted in a simple manner. The inventive method is therefore in particular suitable for the use within the framework of a safety control system in an automation network in order to transmit subscriber identifications, i. e. generally addresses of safety-relevant subscribers, to the safety control system. By means of the circulation of two telegrams, it may be safeguarded that the safety control system which may be at any arbitrary position on the transmission path reliably receives the addresses of all safety-relevant subscribers. The test procedure carried out by means of the subscriber on entering the subscriber identification into the telegrams serves to prevent errors in the address transmission.

According to an embodiment, one of the subscribers on the ring-bus communication network comprises a list of subscriber identifications, this subscriber generally being a master subscriber. Then, the following procedure is carried out: each subscriber upon detection of an occupied subscriber-identification field in the first telegram enters an error identification into the subscriber-identification field of the first telegram allocated to the subscriber. When the second telegram passes through, each subscriber verifies whether the subscriber-identification field allocated to the subscriber contains its subscriber identification. Upon detection of an error, the subscriber enters an error identification into the subscriber-identification field of the second telegram allocated to the subscriber. Furthermore, a third telegram is outputted to the ring-shaped transmission path which contains the telegram fields of the second telegram after the circulation on the ring-shaped transmission path, the subscriber comprising a list of subscriber identifications during the passing-through of the third telegram reading in the subscriber-identification fields contained in the third telegram and comparing them with the list of subscriber identifications.

Alternatively, the following procedure may be carried out, as well: each subscriber upon detecting an occupied subscriber-identification field in the first telegram enters an error identification into the subscriber-identification field allocated to the subscriber when the second telegram passes through and verifies whether the subscriber-identification field allocated to the subscriber contains its subscriber identification. A third telegram which contains the telegram fields of the second telegram after the circulation on the ring-shaped transmission path is outputted to the ring-shaped transmission path. Each subscriber then upon detection of an error in the second telegram enters an error identification into the subscriber-identification field of the third telegram allocated to the subscriber when the third telegram passes through. Furthermore, a fourth telegram which contains the telegram fields of the third telegram after the circulation on the ring-shaped transmission path is outputted to the ring-shaped transmission path, the subscriber comprising a list of subscriber identifications during the passing-through of the fourth telegram reading in the subscriber-identification fields contained in the fourth telegram and comparing them with the list of subscriber identifications.

The third and/or fourth telegram which corresponds to the second and/or third telegram which has circulated guarantees that the master subscriber always receives a completely filled-out and verified telegram, relating both to subscriber identifications and error identifications even if the subscribers are arranged behind the master subscriber in the direction in which the telegrams circulate. The further test procedures by means of the subscribers provide for errors in the address transmission being detected reliably.

According to a further embodiment, the subscribers further verify during the passing-through of the first telegram whether subscriber-identification fields arranged before the subscriber-identification field allocated to the subscriber respectively contain a subscriber identification and whether subscriber-identification fields arranged behind the subscriber-identification field allocated to the subscriber are vacant. Upon detection of an error, the subscriber then enters an error identification into the subscriber-identification field of the first or, alternatively, the second telegram allocated to the subscriber. By means of this additional verification, it is guaranteed that the subscribers always enter their subscriber identifications only into the subscriber-identification field allocated to the subscriber by which an increased safety in data transmission may be achieved.

According to a further embodiment, the subscriber identification comprises a serial identification of the subscriber. The serial identification renders the subscriber unambiguously identifiable and it is therefore not required to manually set an additional subscriber identification in the subscribers, e. g. by means of an address-selection switch. The subscriber possesses an address which is unambiguous in the communication network already by the serial identification automatically allocated to it.

This approach considerably simplifies the address allocation to the subscriber and in addition provides an increased safety since the addresses are assigned automatically without any additional manual setting.

According to a further embodiment, each subscriber receives information concerning its position on the ring-shaped transmission path related to the arrangement of the further subscribers on the transmission path and the circulating direction of the telegrams. This information is thereby preferably transmitted either by means of an additional telegram preceding the first telegram or in a header section of the first telegram. By means of this approach, the subscribers on the ring-shaped transmission path are informed in a simple manner which subscriber-identification field in the first telegram is allocated to the respective subscriber.

According to a further embodiment, a unambiguous telegram identification is respectively allocated to the telegrams circulating on the ring-shaped transmission path. This approach provides for an increased safety in the subscriber identification inquiry since it is guaranteed by the telegram identification that the telegrams may be identified unambiguously so that confusion between the telegrams may be excluded.

According to a further embodiment, the telegrams outputted on the ring-shaped transmission path each comprise a test field, wherein during entering the subscriber identification and/or, alternatively, the error identification, the subscribers carry out a calculation of the test value for the telegram and enter it into the corresponding test field. By means of this approach, an increased error safety is achieved for the telegrams. Upon transmitting the data, it may also be detected by means of the additional test field whether an unadulterated data transmission has taken place.

According to a preferred embodiment, at least one subscriber on the ring-shaped transmission path is a setting device which enters a setting value as a subscriber identification into the subscriber-identification field of the first telegram allocated to the first subscriber. By means of this approach, it is possible to also carry out a safe transmission of setting values in addition or alternatively to a safe transmission of subscriber identifications. By means of said setting values it may be determined e. g. in the master subscriber which mode of the control program to be carried out is to be used if the control program comprises different variants, e. g. a safety mode and a standard mode. Generally, it is also possible to carry out the transmission of setting values independently from the subscriber identifications.

The preceding description describes exemplary embodiments of the invention. The features disclosed therein and the claims and the drawings can, therefore, be useful for realizing the invention in its various embodiments, both individually and in any combination. While the foregoing is directed to embodiments of the invention, other and further embodiments of this invention may be devised without departing from the basic scope of the invention, the scope of the present invention being determined by the claims that follow.

The invention claimed is:

1. A method for retrieving subscriber identifications in a communication system having multiple subscribers which are connected to a ring-shaped transmission path, the method comprising:
    outputting a first telegram onto the ring-shaped transmission path by a control computer, which first telegram comprises a sequence of telegram fields, wherein each subscriber is allocated a telegram field for entering its subscriber identification and each subscriber checks during passing-through of the first telegram if the subscriber identification field allocated to the subscriber is vacant;
    upon detecting a vacant subscriber identification field, each subscriber entering that subscriber's subscriber identification; and
    outputting a second telegram onto the ring-shaped transmission path by the control computer, which second telegram contains the subscriber identification fields of the first telegram after circulation of the first telegram on the ring-shaped transmission path.

2. The method according to claim 1, further comprising upon detecting an occupied subscriber identification field in the first telegram, each subscriber entering an error identification into the subscriber identification field allocated to the subscriber of any of the first telegram and the second telegram.

3. The method according to claim 1, wherein at least one of the subscribers comprises a list of subscriber identifications, and further comprising:
    upon detecting an occupied subscriber identification field in the first telegram, each subscriber entering an error identification into the subscriber identification field allocated to the subscriber of the first telegram;
    each subscriber checking during passing-through of the second telegram if the subscriber identification field allocated to the subscriber contains that subscriber's subscriber identification, and upon detecting an error, each subscriber entering an error identification into the subscriber identification field allocated to the subscriber of the second telegram; and
    outputting a third telegram onto the ring-shaped transmission path, the third telegram containing the telegram fields of the second telegram after circulation on the ring-shaped transmission path, wherein the subscriber comprising a list of subscriber identifications, that subscriber reading in the subscriber identification fields contained in the third telegram during passing-through of the third telegram and comparing the subscriber identification fields with the list of subscriber identifications.

4. The method according to claim 3, further comprising during the passing-through of the first telegram, each subscriber further checking whether subscriber identification fields arranged before the subscriber identification field allocated to the subscriber respectively contain a subscriber identification and whether subscriber identification fields arranged behind the subscriber identification field allocated to the subscriber are vacant, and upon detecting an error, each subscriber entering an error identification into the subscriber identification field allocated to the subscriber of the first telegram.

5. The method according to claim 1, wherein at least one of the subscribers comprises a list of subscriber identifications, and further comprising:
    upon detecting an occupied subscriber identification field in the first telegram during circulation of the second telegram, each subscriber entering an error identification into the subscriber identification field allocated to the subscriber of the second telegram and checking whether the subscriber identification field allocated to the subscriber contains its subscriber identification;
    outputting a third telegram onto the ring-shaped transmission path, which third telegram contains the telegram fields of the second telegram after circulation on the ring-shaped transmission path, each subscriber entering an error identification into the subscriber identification field of the third telegram upon detecting an error in the second telegram during passing-through of the third telegram; and
    outputting a fourth telegram onto the ring-shaped transmission path, which fourth telegram contains the telegram fields of the third telegram after circulation on the ring-shaped transmission path, wherein the subscriber comprising a list of subscriber identifications, that subscriber reading in the subscriber identification fields contained in the fourth telegram during passing-through of the fourth telegram and comparing the subscriber identification fields with the list of subscriber identifications.

6. The method according to claim 5, further comprising:
    during the passing-through of the first telegram each subscriber checking whether subscriber identification fields arranged before the subscriber identification field allocated to the subscriber respectively contain a subscriber identification and whether subscriber identification fields arranged behind the subscriber identification field allocated to the subscriber are vacant; and
    upon detecting an error in the first telegram, each subscriber entering an error identification into the subscriber identification field allocated to the subscriber of the second telegram.

7. The method according to claim 1, wherein the subscriber identification comprises a serial identification of the subscriber.

8. The method according to claim 1, further comprising each subscriber receiving information on that subscriber's position on the ring-shaped transmission path with respect to the further subscribers and the circulating direction of the telegram.

9. The method according to claim 8, further comprising transmitting the information on the respective position of the subscribers on the ring-shaped transmission path by means of a telegram preceding the first telegram.

10. The method according to claim 8, further comprising transmitting the information on the respective position of the subscribers on the ring-shaped transmission path with a header section of the first telegram.

11. The method according to claim 1, wherein the telegrams outputted onto the ring-shaped transmission path each comprise an unambiguous identification.

12. The method according to claim 1, wherein the telegrams outputted onto the ring-shaped transmission path each comprise a test-value field, wherein during entering the any of the subscriber identification and the error identification the subscribers carry out a calculation of a test value for the telegram and enter it into the test-value field.

13. The method according to claim 1, wherein at least one subscriber on the ring-shaped transmission path is a setting device and as a subscriber identification enters a setting value into the subscriber identification field allocated to the subscriber of the first telegram.

14. A communication system comprising:
multiple subscribers which are connected to a ring-shaped transmission path; and
a configuration subscriber;
wherein the configuration subscriber is configured to output a first telegram onto the ring-shaped transmission path during the initialization of the communication system, which first telegram comprises a sequence of telegram fields, wherein each subscriber is allocated a telegram field for entering its subscriber identification, wherein each subscriber is configured to check during passing-through of the first telegram whether the subscriber identification field allocated to the subscriber is vacant and to enter that subscriber's subscriber identification upon determining a vacant subscriber identification field; and
wherein the configuration subscriber is further configured to output a second telegram onto the ring-shaped transmission path, which second telegram contains the subscriber identification fields of the first telegram after circulation on the ring-shaped transmission path.

15. The communication system according to claim 14, wherein each subscriber is configured to enter an error identification into the subscriber identification field allocated to the subscriber of any of the first telegram and the second telegram upon detecting an occupied subscriber identification field in the first telegram.

16. The communication system according to claim 14,
wherein at least one of the subscribers comprises a list of subscriber identifications;
wherein each subscriber enters an error identification into the subscriber identification field allocated to the subscriber of the first telegram upon detecting an occupied subscriber identification field in the first telegram;
wherein during passing-through of the second telegram each subscriber checks whether the subscriber identification field allocated to the subscriber contains that subscriber's subscriber identification, and upon detecting an error, each subscriber enters an error identification into the subscriber identification field allocated to the subscriber of the second telegram; and
wherein the configuration subscriber is configured to output a third telegram onto the ring-shaped transmission path, which third telegram contains the telegram fields of the second telegram after circulation on the ring-shaped transmission path, wherein the subscriber comprising a list of subscriber identifications reads in the subscriber identification fields contained in the third telegram during passing-through of the third telegram and compares the subscriber identification fields with the list of subscriber identifications.

17. The communication system according to claim 16, wherein each subscriber is configured to further check during the passing-through of the first telegram whether subscriber identification fields arranged before the subscriber identification field allocated to the subscriber respectively comprise a subscriber identification and whether subscriber identification fields arranged behind the subscriber identification field allocated to the subscriber are vacant and upon detecting an error enter an error identification into the subscriber identification field allocated to the subscriber of the first telegram.

18. The communication system according to claim 14,
wherein at least one of the subscribers comprises a list of subscriber identifications;
wherein each subscriber upon detecting an occupied subscriber identification field in the first telegram during passing-through of the second telegram enters an error identification into the subscriber identification field allocated to the subscriber of the second telegram and checks whether the subscriber identification field allocated to the subscriber contains that subscriber's subscriber identification;
wherein the configuration subscriber is configured to output a third telegram onto the ring-shaped transmission path, which third telegram contains the telegram fields of the second telegram after circulation on the ring-shaped transmission path, wherein each subscriber upon detecting an error in the second telegram during passing-through of the third telegram enters an error identification into the subscriber identification field allocated to the subscriber of the third telegram; and
wherein the configuration subscriber is configured to output a fourth telegram onto the ring-shaped transmission path, which fourth telegram contains the telegram fields of the third telegram after circulation on the ring-shaped transmission path, wherein the subscriber comprising a list of subscriber identifications during passing-through of the fourth telegram reads in the subscriber identification fields contained in the fourth telegram and compares the subscriber identification fields with the list of subscriber identifications.

19. The communication system according to claim 18,
wherein each subscriber further checks during the passing-through of the first telegram whether subscriber identification fields arranged before the subscriber identification field allocated to the subscriber respectively contain a subscriber identification and whether subscriber identification fields arranged behind the subscriber identification field allocated to the subscriber are vacant, and
wherein each subscriber upon detecting an error in the first telegram enters an error identification into the subscriber identification field allocated to the subscriber of the second telegram.

20. The communication system according to claim 14, wherein the configuration subscriber is further configured to transmit to each subscriber information on that subscriber's position on the ring-shaped transmission path with respect to the further subscribers and the circulation direction of the telegram.

21. The communication system according to claim 14, wherein at least one subscriber on the ring-shaped transmission path is a setting device which is configured to enter a setting value as subscriber identification into the subscriber identification field allocated to the subscriber of the first telegram.

\* \* \* \* \*